April 12, 1966 W. H. RYAN 3,245,791
PHOTOGRAPHIC TRANSFER PROCESS AND COMPOSITION
Filed Sept. 21, 1964

INVENTOR.
William H. Ryan
BY
Brown and Mikulka
ATTORNEYS

3,245,791
PHOTOGRAPHIC TRANSFER PROCESS AND COMPOSITION
William H. Ryan, Carlisle, Mass., assignor to Polaroid Corporation, Cambridge, Mass., a corporation of Delaware
Filed Sept. 21, 1964, Ser. No. 400,300
4 Claims. (Cl. 96—29)

This application is a continuation-in-part of my copending application Serial No. 834,707, filed August 19, 1959, now abandoned.

This invention relates to an improved diffusion transfer photographic process and, more particularly, to a process for forming dye images in a multilayer film assembly in which there is included a liquid processing composition incorporating a polymeric film-forming dye mordant.

An object of the present invention is to provide a diffusion transfer process wherein a liquid processing composition comprises a high-molecular-weight polymeric dye mordant for more effectively forming a positive image, the mordant having a film-forming capacity such that, when brought to a solidified state, it serves, at least in part, as an image-carrying layer.

Other objects of the invention are to provide for use in such a process an aqueous alkaline processing solution embodying, as a dye mordant, a high-molecular-weight basic nitrogen-containing polymer, which solution is adapted to be releasably-contained in a film assembly of the type used in a self-processing camera, such as the Polaroid Land camera, sold by Polaroid Corporation of Cambridge, Massachusetts, U.S.A.; to provide a process, as described, in which the large size of the molecules of the subject polymeric mordant prevent its entrance into an exposed silver halide emulsion during imbibition of the liquid processing composition into the latter; to provide a liquid processing composition including a polymeric mordant for a selectively light-absorbing, color-providing material, e.g., a dye-image-forming substance; to provide a liquid processing composition including a dye mordant of the character described which is adapted to be used with a complete dye of a type possessing an inherent color; to provide a liquid processing composition including a dye mordant, as described, which is suitable for use with an organic substance carrying anionic substituents or groups such as phenolic, carboxylic or sulfonic acid groups; to provide a liquid processing composition including a polymeric mordant which is adapted to be used with a dye intermediate such as a self-coupling developer or a color coupler; to provide a liquid processing composition containing a mordant which is effective for use with an optical brightener such as an ultraviolet-absorbing substance of the type of a fluorescent dye; to provide a liquid processing composition having a high pH and containing an acid polymeric thickener in which there is a substantially uniform, very fine dispersion of a polymeric basic nitrogen-containing mordant; to provide a composite photographic film assembly comprising at least one photosensitive layer, a container having therein a liquid processing composition of the character described, and an image-carrying layer; to provide a processing fluid containing a developing agent, a substance adapted to form from a latent negative photographic image positive image-forming components, a polymeric, high-molecular-weight, basic nitrogen-containing mordant, and a film-forming substance such as sodium carboxymethyl cellulose; to provide a processing fluid of the character described wherein there is contained, as a mordant, a polymeric substance containing a quaternary salt of polyvinyl pyridine; to provide a processing fluid wherein there is included a basic nitrogen-containing mordant which, of itself, constitutes a thickening agent or which complements or reinforces another substance in a film-forming capacity; and to provide a diffusion transfer process wherein a polymeric, high-molecular-weight, basic nitrogen-containing mordant is included in a processing fluid with developing and transfer chemicals, and other materials as, for example, an additional silver reducing or accelerating substance to produce a print of superior definition, proper density and correct color characteristics.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawing wherein.

As intimated, the present invention is principally concerned with an improved method and materials for processing one or more exposed silver halide emulsion layers of a multilayer film assembly to provide, through diffusion transfer, a positive print of the latent image in the emulsion. The method involves the employment of an adequately stable liquid processing composition embodying a high-molecular-weight, polymeric mordant, releasably-carried in a container element of a multilayer film assembly. While the possibility of employing a mordant in a processing liquid has been given passing mention in the U.S. Patents 2,707,150, 3,019,124 and 3,077,402, the substances suggested therein possess neither the film-forming properties nor the large molecular size of the high-molecular-weight, polymeric mordants of the present invention. Accordingly, they would be generally unsuited to employment in the processes and liquid processing compositions described herein.

The present invention is especially adapted to the formation of continuous-tone dye images in a color or colors, to the formation of screen color components, and to production of the latter in conjunction with silver-image-forming components. In particular, the present invention is of importance where a multicolored image is to be formed and where special problems relating to image density, definition, color range, and color accuracy may be of concern. The method and materials of the present invention are believed to possess advantages when employed either in a subtractive or in an additive procedure of forming colored images. The film assembly of FIG. 1, for example, is representative of a subtractive method and that of FIG. 2 is illustrative of an additive method of providing a multicolored image.

Figure 1:
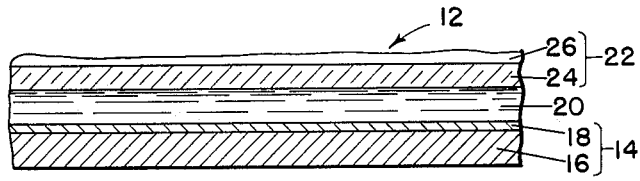
FIGURE 1 is a diagrammatic, fragmentary side view, partly in cross-section, of a composite film structure of the invention.
Figure 2:
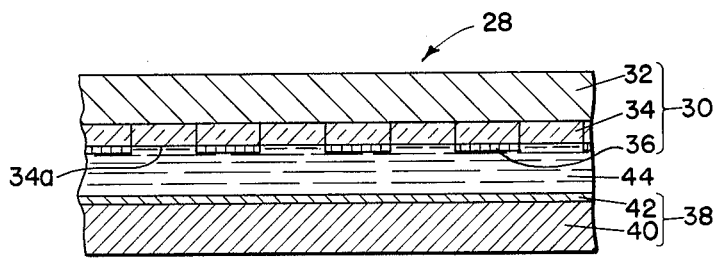
FIG. 2 is a diagrammatic, fragmentary side view of another composite film assembly of the invention.

Referring to the photographic assembly 12 of FIG. 1, there is shown a multilayer film structure comprising elements both for performing a photographic exposure and, thereafter, for producing a positive print in a self-processing camera of the type previously mentioned. The assembly 12 includes an image-receiving element 14 comprising a supporting or base layer 16 and having a surface 18 especially adapted to adhere to a solidified layer of a film-forming substance of a processing composition 20 which has been applied in the form of a liquid medium. The base layer 16 may be transparent or opaque depending upon intended usage as a transparency or a reflection print. The assembly also includes a film element 22 having a photosensitive silver halide emulsion layer 24, permeable to the processing liquid, sensitized to a given color or colors, and either possessing an organic diffusible color-providing substance of the character described or having such a substance associated therewith in an adjacent layer. Film element 22 and image-receiving element 14 may be supplied separately and brought together to the superimposed position shown after the photographic exposure. Alternatively, the elements 14 and 22 are in pre-assembled relation and the exposure takes place either through layers 16 and 18, which are transparent for the purpose, or from the side of element 22 remote therefrom. An adjacent layer 26 of the film element is located contiguous layer 24 and its characteristics depend upon the specific nature of the process. For a process producing a single dye image, of a neutral tone or a chosen color, layer 26 may be considered merely as a base layer serving as a support for emulsion layer 24 or it may, additionally, carry a color-providing substance.

Figure 3:
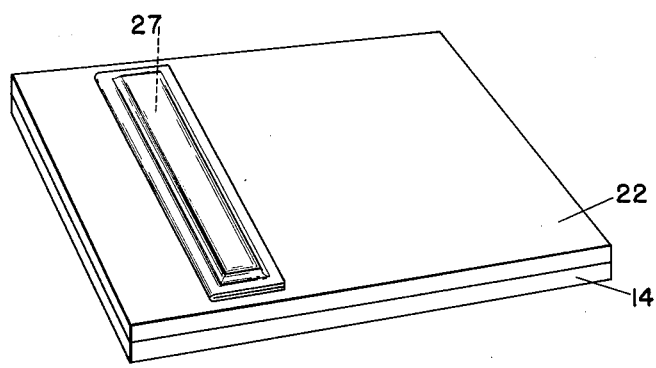
FIG. 3 is a diagrammatic, perspective view of a film assembly of the invention.

In a multicolor process, layer 26 may constitute a second differentially sensitized photosensitive emulsion or, again, it may be a layer carrying a color-providing substance. Layer 26 may also carry some further substance essential to the photographic process such as a developing agent or it may provide a barrier or impeding layer for some desired purpose known to the art. The liquid processing composition 20 is preferably an aqueous solution which has been released, usually under a compressive force, from a rupturable liquid container (27 of FIG. 3) carried, for example, on the surface 18 of base material 16. The container is so placed as to be positioned between elements 14 and 22, at one side of the area in which the image is to be formed, the liquid having been released and spread between layers 18 and 24 after exposure of the latter and during compression of the container in the aforementioned self-processing camera. A fluid container of a type generally suitable for the purpose is described in U.S. Patents Nos. 2,543,181 and 2,634,886 and a processing fluid, releasably carried by a container of a generally similar category, has been described in U.S. Patent No. 2,647,056.

As previously mentioned, after the exposure of emulsion 24 by appropriate color-separation means such as dye sensitizer means within an emulsion or emulsions or filter means (not shown), the essential processing ingredients of the released and spread fluid 20 are permeated into at least the emulsion layer 24 and also into layer 26, if the latter carries a color-providing substance or some other soluble substance involved in the process. The latent negative image in the emulsion is developed, an imagewise distribution of a dye-image-forming substance occurs therein as a function of development, and the diffusion transfer of dye-image-forming components from the emulsion and from any other layer which may be involved as, for example, from layer 26, to an image-receiving layer such as the layer of processing fluid in a solidified state, is performed. The image-carrying element 14 with the solidified layer 20 adhering thereto and bearing the positive print is then stripped away from the film element 22.

The processing composition 20, in its simplest form, is a solution, preferably aqueous, containing a polymeric dye mordant which serves also as a thickening and film-forming agent. However, the inclusion of an additional film-forming substance may, in certain instances, be desirable, the mordant and additional substance serving together in this capacity. The film-forming material, whether composed of one or of two complementary substances, is adapted to undergo relatively rapid solidification after spreading of the fluid whereby layer 20 may assume the role of an image-receiving element, adapted to carry, at least in large part, the positive image formed by diffusion transfer of the dye-image-forming components. A suitable film-forming material, additional to the mordant per se, for incorporation with the processing fluid, is a high-molecular-weight polymer such as a polymeric, water-soluble ether inert to an alkali solution, of which a hydroxyethyl cellulose or sodium caboxymethyl cellulose constitutes a preferred example. The solidified layer of processing composition 20, with the mordant distributed therein, is adapted to adhere to a hydrolyzed surface layer 18 and to remain integral therewith, in the instance where the image-receiving element is ultimately stripped from the film element 22, for viewing purposes.

Substances serving as dye mordants when included in the processing composition, with the aforementioned ingredients, and with others to be described below, are those of the class of high-molecular-weight, basic nitrogen-containing polymers having a film-forming property. Among basic nitrogen-containing compounds particularly suitable for the purpose are polymeric substances containing a quaternary salt of polyvinyl pyridine such as polyvinyl pyridine ethyl methane sulfonate and a polyvinyl pyridine p-toluene sulfonate. Among other substances found to be effective as mordants for this use are polyethylene imine, and a poly-$\beta$-diethylamine ethyl methacrylate quaternary salt.

Various other elements constributive to development of latent images and to the dye-image-forming operation may be present in the processing fluid in addition to a dye mordant of the foregoing type, or they may be in the layers of the film assembly, or to some degree in either location. Thus, the liquid processing composition may preferably contain, as an accelerator for providing a proper pH and for furthering the permeability of a gelatino silver halide emulsion, an alkaline compound such as diethylamine, sodium hydroxide or sodium carbonate. The processing fluid may also include a developing agent such as p-phenylenediamine, p-diethylaminoaniline, a hydroquinone, p-aminophenol, metol or diaminophenol, the latter permitting omission of the alkali, or the developing agent may be contained in a layer of the film assembly and rendered functional upon permeation thereof the processing liquid. The processing liquid may also contain a restrainer and anti-fogging agent such as potassium bromide, sodium thiosulfate as a fixing agent, or another ingredient contributive to an improved quality of the photographic print and a diffusion transfer process of the character described. It is also possible that the processing fluid may comprise an organic, water-miscible solvent, i.e., ethanol. Compatability of the mordants of the present invention with additional ingredients of the liquid processing composition of the character described is, of course, an essential.

It has been stated that various neutral-tone- and color-providing substances are employable in conjunction with the processing fluid of the invention for producing positive images in black-and-white and in one or more colors. Such substances may, for example, be in the form of complete dyes, having inherent color properties and adapted to form dye images. One such dye is a simple or nonreactable dye contained in an emulsion or in an adjacent layer, and rendered diffusible to an image-receiving surface by the processing fluid. Examples of simple acid dyes suitable for the purpose are the additive dyes Direct Green 27 (C.I. 2nd Edition), Direct Yellow 4 (C.I. 2nd Edition) (for red), Direct Blue 76 (C.I. 2nd Edition), and subtractive dyes (for magenta) such as Acid Red. 1, Acid Violet 12, and Acid Red 34 (all C.I. 2nd Edition). Another material classifiable as a complete dye for use with the processing fluid is a dye developer having both a chromophoric and a silver halide developing property and which may be located in a layer of the film assembly or even in the processing fluid itself. Examples of suitable dye developers are 1,4-bis-[$\alpha$-methyl-$\beta$-hydroquinonyl - ethylamino]-anthraquinone and 2 - [p-(2',5' - dihydroxyphenethyl) - phenylazo] - 4 - propoxy-1 - naphthol. Other complete dyes which may be employed include reducible dyes and coupling dyes. An example of a suitable reducible dye is 1-phenyl-3-N-n- hexyl - carboxamido - 4 - [p - (2',5' - dioxophenthyl)-phenylazo]-5-pyrazolone. Examples of coupling dyes are Fast Crimson 6BL (C.I. 57), which is water- and alkali - soluble, and 1,5-dihydroxynaphthalene-4-azobenzene, which is water-insoluble but alkali-soluble. Other color-providing substances adapted to use with processing compositions of the invention include self-coupling developers wherein the developing agent couples with itself to provide a dye through the oxidation of unreacted portions thereof, color couplers which transfer with unreacted developing agent and are reacted, adjacent the image-receiving surface, with oxidized developing agent to provide dye images, and other radiation-absorbing substances, such as an ultraviolet-absorbing substance of the type of a fluorescent dye. In all of the foregoing examples, the dye mordant contributes to a substantially rectilinear diffusion of the dye-image-forming components and to improved image definition. Where the dye mordant is a basic nitrogen-containing polymer, the color-providing substance is of a character comprising anionic substituents or groups such as phenolic hydroxyl, carboxylic or sulfonic acid groups.

A somewhat different use of the processing composition of the present invention is illustrated by the additive screen-type assembly 28 of FIG. 2. A film unit 30 of the assembly is composed of base 32, an orthochromatic silver halide emulsion 34 and screen elements 36, in the form of dots, lines or some other configuration, printed on the emulsion and containing a dye sensitizer for modifying the sensitivity of the orthochromatic emulsion in the areas where applied, and a diffusible dye of a selected color, at least the sensitizer penetrating into aligned portions of the emulsion. Screen elements or interstices 34a are provided by the areas of emulsion 34 lying between screen elements 36. On image-carrying unit 38 of the assembly includes a transparent base 40 and a surface layer 42 adapted to adhere firmly with a layer of the solidified processing fluid 44. The processing fluid is of a type hereinbefore described containing a dye mordant. Exposure of the emulsion is performed through screen elements 36. Considerations relating to the superimposition of unit 38 with unit 30, the opacity or transparency of base 40, and the release and spreading of the processing fluid are generally similar to those described relative to FIG. 1.

Assuming the emulsion 34 to have been photographically exposed and the processing fluid 44 to have been spread between film unit 30 and image-carrying unit 38 and to have permeated at least into screen elements 36 and 34a, the exposed silver halide is reduced to silver, the unreduced silver halide in partially and completely unexposed areas is rendered diffusible and, with the diffusible dye, transfers to the layer of solidifying film-forming substance wherein an image in color is formed through proper alignment of silver image components and screen components composed of the transferred dye.

In a modification of the structure of FIG. 2, the interstices 34a may be treated so as also to contain a diffusible dye of a color different from that of screen elements 36 or additional screen elements may be included to provide three colors. A further modification would, for example, provide screen elements 36 composed of a panchromatic silver halide emulsion and containing a diffusible dye. In another modification, layer 34 is a panchromatic or red-sensitized emulsion and the screen elements contain a diffusible dye of a selected color. In these modifications, additional diffusible dyes may be provided in the interstices 34a for filtering and transfer purposes to provide a two-color structure. Again, a third set of screen elements may be added to form a three-color additive film assembly. A further screen method contemplates the formation, through transfer of dye-image-forming screen components, of a screen print or a portion thereof substantially entirely in terms of screen dye image components, without transfer of, and alignment with, silver image components.

The following examples of the formation of images through diffusion transfer operations which involve methods and materials of the present invention are given for purposes of illustration only.

*Example 1*

A continuous screen pattern of red dots was printed, in the absence of actinic light, on a panchromatic negative emulsion. The dots were rendered in an ink composition and were formed by a rotogravure type of printing cylinder. The printing ink composition was a mixture of the following:

| | |
|---|---|
| Methanol _____ cc__ | 210 |
| Carbitol _____ cc__ | 60 |
| Cellulose acetate hydrogen phthalate _____ grams__ | 45 |
| Luxol Fast Red BB _____ do___ | 21 |
| Purified Brilliant Yellow C (Direct Yellow 4) _____ do___ | 21 |

The emulsion was photographically exposed through the printed red screen pattern. A processing composition was applied comprising 5 cc. of a viscous processing compositon of the type which provides a layer in which a silver transfer image may be formed, such as the processing composition employed in Polaroid Land Film Type 46, to which composition was added 0.1 gram of poly-2-vinyl-pyridine ethyl methane sulfonate and 0.5 cc. of 3% acetic acid. An image-receiving sheet comprising a surface-hydrolyzed cellulose acetate sheet, to which the solidified layer of processing fluid adheres, was superimposed with the emulsion. After a two-minute imbibition period, the cellulose acetate sheet with the solidified layer of processing fluid adhering thereto was stripped from the emulsion and contained an image in silver in addition to the screen pattern of red dots.

*Example 2*

A layer of a cyan dye, 1 - ($\alpha$ - hydroxymethyl-propylamino) - 4 - ($\alpha$-methyl - $\beta$ - hydroquinonyl-ethylamino)-5,8-dihydroxy-anthraquinone was coated on a film of acetate and solidified. A uniform layer of a silver halide emulsion coating was applied over the dye coating using a composition composed of:

| | Cc. |
|---|---|
| A red-sensitive, gelatino-silver halide emulsion _____ | 45 |
| Water _____ | 30 |

The emulsion was photographically exposed. It was processed while in contact with a film of surface-hydrolyzed cellulose acetate, of the character described in Example 1, using the processing fluid prepared by mixing the following:

| | Cc. |
|---|---|
| Aqueous solution containing by weight 2.5% sodium hydroxide and 4% sodium carboxymethyl cellulose _____ | 5 |
| Aqueous solution containing by weight 20% poly-2-vinyl-pyridine p-toluene sulfonate and 3% acetic acid _____ | 0.5 |

The dye was transferred to the solidified layer of processing composition, adhering to the treated surface of the acetate film. The resulting transfer density was greater than that obtained when the same procedure was repeated, without the mordant.

A similar increase in transfer density was observed with the cyan dye, 1,4-bis-($\alpha$-methyl-$\beta$-hydroquinonyl-ethylamino)-anthraquinone.

*Example 3*

A multilayer negative of the type used in Polaroid Polacolor Film, Type 48, was overcoated to provide a stripping layer containing dimethyl hydantoin formaldehyde and gum arabic.

This negative was photographically exposed and was processed while in contact with a film of surface-hydrolyzed cellulose acetate, using a liquid processing composition prepared by mixing the following:

|  | Cc. |
|---|---|
| An aqueous solution containing by weight 2.5% sodium hydroxide | 4 |
| An aqueous solution of the polymeric mordant containing by weight 10% para-dimethyl amino benzal of polyvinyl alcohol p-toluene sufonate quaternary salt. | 10 |

The dye was transferred to the solidified mordant of the liquid processing composition, the latter adhering to the hydrolyzed surface of the cellulose acetate film during stripping of the negative.

The above procedure was repeated employing, in place of the para-dimethylamino benzal of polyvinyl alcohol p-toluene sulfonate quaternary salt mordant, each of the following mordants:

10% methyl tosylate quaternary of poly-dimethylamino ethyl methacrylate;
10% methyl tosylate quaternary of poly-2-vinyl pyridine;
10% methyl tosylate quaternary of poly-4-vinyl pyridine.

In all of the foregoing adaptations, wherein there is diffusion transfer of dye-image-forming components from an emulsion or a contiguous layer to an image-receiving substance, and wherein the liquid processing composition is an aqueous alkaline solution comprising a basic nitrogen-containing mordant of the character described, a particular advantage, in addition to the film-forming function, appears to be attributable to the presence of the mordant in the fluid. For example, it is usual for a dye to diffuse somewhat at random in various directions when subjected to water and an alkali, as customarily contained in a processing solution without a dye mordant also being present. However, where the dye mordant is an ingredient of the processing fluid, as in the present invention, and where the size of the molecules of the mordanting compound is large, such as in a basic nitrogen-containing polymer, a particular advantage is to be noted as follows. The mordant, apparently because of the large size of its molecules, cannot readily diffuse into the emulsion and thus remains within the layer of processing fluid and enhances the diffusion of the color-providing substance into this layer, in which the image is preferably formed. Accordingly, rapid and thorough transfer of a dye or the like to the image-carrying layer is accomplished and diffusion in an unwanted direction, i.e., laterally, is held to a minimum.

While developer and transfer chemicals usually have a high pH and basic nitrogen-containing polymers usually precipitate under such conditions, the quaternary salts of polymers hereinbefore mentioned do not thus precipitate. It is possible to employ polymers which do precipitate, however, provided that they are finely dispersed within the processing fluid.

Where a film-forming ingredient additional to the polymeric mordant is employed, sodium carboxymethyl cellulose constitutes a preferred substance for the purpose. It is a polymeric, acidic substance and its acid groups may ordinarily tend to react with the basic groups of the nitrogen-containing polymer to form an undesirably gummy substance. One method of avoiding this condition is by first preparing an aqueous solution of the sodium carboxymethyl cellulose, or of the latter and a developing agent, in which the sodium carboxymethyl cellulose is thoroughly dispersed, making a second aqueous solution or dispersion of the basic nitrogen-containing polymer, and mixing the two solutions together, in a beating operation.

Since certain changes may be made in the above product and process without departing from the scope of the invention herein involved, it is intended that all matter contained in the above description or shown in the accompanying drawing shall be interpreted as illustrative and not in a limiting sense.

What is claimed is:

1. In a diffusion transfer process of producing a photographic image which comprises exposing a photosensitive element including a photosensitive silver halide emulsion, applying a liquid processing composition to said photosensitive element to effect development of said exposed silver halide emulsion and the formation of an imagewise distribution therein of a dye-image-forming substance initially carried in one of said emulsion and another layer of said photosensitive element as a function of said development, said dye-image-forming substance including an anionic group selected from the group consisting of phenolic hydroxyl, carboxylic acid and sulfonic acid groups, and transferring at least part of said imagewise distribution of said dye-image-forming substance from said silver halide emulsion to a superposed support carrying an image-receiving layer provided by said processing composition, to provide a visible image rendered in terms of an organic dye, the step of providing an improved rapidity and rectilinear direction of said transfer by treating said emulsion with a liquid processing composition comprising a finely dispersed high-molecular-weight, basic nitrogen-containing polymer, said polymer being of a type constituting a mordant for said dye-image-forming substance and substantially incapable of entering said emulsion because of the large size of its molecules, and said polymer by reason of its concentration and molecular weight, being of a film-forming category providing, upon solidification, said image-receiving layer which is adapted to adhere, preferentially, to said superposed support.

2. A process, as defined in claim 1, wherein said dye-image-forming substance is selected from the class consisting of complete dyes and dye intermediates and said mordant is a quaternary salt of polyvinyl pyridine.

3. A process, as defined in claim 1, wherein said mordant is polyvinyl pyridine ethyl methane sulfonate.

4. A process, as defined in claim 1, wherein said mordant is polyvinyl pyridine p-toluene sulfonate.

References Cited by the Examiner
UNITED STATES PATENTS

| 2,707,150 | 4/1955 | Land | 96—29 |
| 2,756,142 | 7/1956 | Yutzy | 96—3 |
| 3,019,124 | 1/1962 | Rogers | 96—3 |
| 3,077,402 | 2/1963 | Blout et al. | 96—29 |

NORMAN G. TORCHIN, *Primary Examiner.*